US005347127A

United States Patent [19]

Franzen

[11] Patent Number: 5,347,127

[45] Date of Patent: Sep. 13, 1994

[54] METHOD AND DEVICE FOR IN-PHASE EXCITATION OF ION EJECTION FROM ION TRAP MASS SPECTROMETERS

[75] Inventor: Jochen Franzen, Bremen, Fed. Rep. of Germany

[73] Assignee: Bruker-Franzen Analytik, GmbH, Bremen, Fed. Rep. of Germany

[21] Appl. No.: 996,058

[22] Filed: Dec. 23, 1992

[30] Foreign Application Priority Data

Dec. 23, 1991 [DE] Fed. Rep. of Germany ....... 4142871

[51] Int. Cl.[5] ........................ B01D 59/44; H01J 49/00

[52] U.S. Cl. .................................. 250/292; 250/282

[58] Field of Search ................................ 250/282, 292

[56] References Cited

U.S. PATENT DOCUMENTS 4,573,175 2/1986 Cressey ................................ 377/44

4,650,999 3/1987 Fies et al. ............................ 250/292

5,028,777 7/1991 Franzen et al. ...................... 250/292

FOREIGN PATENT DOCUMENTS 0383961 8/1990 European Pat. Off. .

*Primary Examiner*—Bruce C. Anderson

*Attorney, Agent, or Firm*—Cesari and McKenna

[57] ABSTRACT

An improvement of a fast scanning method in an ion trap mass spectrometer comprises setting the frequency and phase relationships between the ion trap storage frequency and the ion trap excitation frequency in such a way that the ions of consecutive masses each gain precisely the same "phase rhythm" or "phase sequence". The phase rhythm, or the historical succession of phase positions up to ion ejection, is optimally set in accordance with nonlinear resonance conditions used to cause ion ejection. The excitation voltage frequency is set to a value somewhat smaller that an integral fraction of the storage voltage frequency and the scan profile is set based on the excitation frequency so that the same time is required for ions of each mass to be ejected and so that precisely an integer number of cycles of the excitation frequency is used per mass.

26 Claims, 2 Drawing Sheets

METHOD AND DEVICE FOR IN-PHASE EXCITATION OF ION EJECTION FROM ION TRAP MASS SPECTROMETERS

FIELD OF THE INVENTION

The invention concerns methods and devices for recording mass spectra by using an RF quadrupole ion trap in which ions are retained in the trap by a storage RF voltage applied between the trap end caps and ejected mass-sequentially through holes m one of the ion trap end caps under the influence of an excitation RF voltage. The invention is more particularly concerned with the establishment of selected phase relationships between the excitation RF voltage and the storage RF voltage.

BACKGROUND OF THE INVENTION

Quadrupole ion traps according to Paul and Steinwedel (DE-PS 944 900) consist of ring and end cap electrodes between which an essentially quadrupolar storage field is generated by applying RF voltages to the ring and end caps. Ions with varying mass-to-charge ratios (m/q) can be stored at the same time in this field (for the sake of simplicity, only "masses" instead of "mass-to-charge ratios" are referred to in the following since, in ion traps, one is predominantly only concerned with singly charged ions).

Physically intrinsic resonance conditions of the storage field are preferably used for ion ejection. With a pure quadrupole field, resonance conditions of this kind are found at the edge of the stability zone in the a,q diagram. In addition, with certain nonlinear conditions, in particular, those which occur in the case of a superposition of multipole fields, resonance conditions occur inside the stability zone and can also be used for ion ejection.

FIG. 1 shows some known storage field resonance conditions for a pure quadrupole field and for superposed hexapole and octopole fields plotted on an a,q stability diagram. The storage field resonances, $\beta_z=1$ (for pure quadrupole), $\beta_z=\frac{2}{3}$ (for hexapole superposition), $\beta_z+\beta_r=1$ and $\beta_z=\frac{1}{2}$ (both for octopole superposition), have been plotted. The following applies in the customary manner:

$$a=-8zU/(mr_0^2\omega^2),q=4zV/(mr_0^2\omega^2)$$

where:

z=Coordinate of the rotationally symmetric axis of the ion trap,

U=Direct voltage with which the RF storage field is superposed, m=Mass of ions, $r_0$=Inside radius of the ring electrode, $\omega$=Angular frequency of the storage RF, and V=Amplitude (voltage) of the storage RF The advantages of these superposed multipole fields are discussed in detail in the International Journal of Mass Spectroscopy Ion Processes, J. Franzen, v. 106, pp. 63–78 (1991) which article is hereby incorporated by reference.

For measurement of the spectra, the ions are brought to a resonance condition of this kind mass by mass by changing the amplitude of the quadrupole RF storage field. When ions of a particular mass reach the resonance condition, they absorb energy from the RF storage field, enlarge their oscillation amplitudes and leave the ion trap through small holes in one of the end caps. The ejected ions can then be measured outside the ion trap with an ion detector.

The secular oscillation frequency of the ions varies widely after their production or introduction into the trap. Consequently, in order to provide a well-resolved mass spectrum, it is necessary to first collect the oscillating ions confined in the ion trap near the center of the ion trap to enable the ions of successive masses to leave the ion trap in ejection cycles clearly separated from each other in terms of time. For this, the ion trap is preferably filled with a special damping gas having an optimal density enabling the ions to release energy by colliding with the remaining gas in the trap. When such a gas is introduced, the trapped ions "thermalize" after a few collisions and collect at the center of the quadrupole field due to the focusing effect of the quadrupole field, reducing their oscillation amplitudes at the same time. They form a small cloud, the diameter of which is only approximately 1/20 to 1/10 of the dimensions of the trap according to tests carried out with laser beams as described in Physical Review A, I. Siemers, R. Blatt, T. Sauter and W. Neuhauser, v. 38, p. 5121 (1988) and Journal of the Optical Society of America B, M. Schubert, I. Siemers and R. Blatt, v. 6, p. 2159 (1989). Thermalization takes place particularly quickly with medium-weight damping gas molecules such as air.

However, in order to absorb energy under resonance conditions physically built into the storage field, the ions cannot be in a state of calm at the center of the quadrupole field since the RF field strength vanishes there and the ions are not affected by the intrinsic resonance conditions in the storage field. Absorption of energy is only possible as the ions move outwards from the field center and energy absorption actually increases the further the ions are from the field center due to oscillations.

It is therefore beneficial to intentionally weakly excite the secular oscillation of the ions shortly before they are brought to the resonance condition. This excitation is produced by subjecting the ions to resonance with a weak RF excitation voltage connected via the two end caps to produce an effective field at the center of the ion trap. Only this initial coherent excitation of the ions of a selected mass enables them to absorb energy from the RF storage field in the further course of the scanning process on reaching the resonance condition. In so doing, they are exponentially accelerated in the direction of the end caps and thus ejected from the ion trap.

Methods are also already known for removing ions the ion trap in resonance solely by the effect of the excitation RF applied (for example, as described in Center for Applied Physics, G. Rettinghaus, v. 22, p. 32 (1967). However, the absorption of energy solely from the excitation RF field essentially leads to a linear rise in secular amplitude. This compares to an exponential increase produced by the storage field resonance conditions. Consequently, ion ejection in the case of storage field resonances is very much sharper due to the field resonance and can be carried out in fewer oscillation cycles.

A simple scanning method with mass-sequential ejection of ions utilizing the limit of the stable storage range ($\beta_z=1$) in the a,q diagram, without application of an additional excitation frequency for exciting the secular oscillation, has already been know for some time and is described in U.S. Pat. No. 4,540,884. A considerable improvement in the resolution of this method was obtained by the introduction of "axial modulation", which is a coherent excitation of the secular oscillation shortly before reaching the stability limit as described in EP-AL 0 350 159. Utilization of the nonlinear resonance, $\beta_z+\beta_r=1$, produced by superposing a weak octopole field onto the quadrupole field, is similarly well-known for ejection of ions after initial pushing of the secular oscillation as described in EP-AL 0 383 961.

As far as ion ejection is concerned, the nonlinear multipole resonance conditions and the resonance on the stability margin differ only in so far as the multipole resonances each show sharply defined singularities, while the stability margin, $\beta_z=1$, of the quadrupole field sharply separates two large areas, one stable and the other unstable. In both cases, however, the ions experience conditions trader which they are able to absorb oscillation energy from the storage field.

As already shown above, the oscillation energy absorbed is all the greater, the further the ions are (at the maximum of their oscillation amplitude) from the center of the field. This absorption produces an exponential rising of the oscillation amplitude of the ions at these points. If all ions of the cloud are coherently pushed under the same conditions, they will continue to absorb energy practically synchronously. If the diameter of the cloud of the ions of a mass does not greatly increase but the oscillation amplitude increases considerably, all the ions will leave the ion trap in just a flew oscillation cycles. This produces a good mass resolution, even with very fast scanning methods.

In addition to the stability margin resonance, $\beta_z=1$, of the basic quadrupole field, the hexapole resonance, $\beta_z=\frac{2}{3}$, and octopole resonance, $\beta_z=\frac{1}{2}$, are of particular interest (as shown in FIG. 1) since, in these three cases, absorption of energy of the secular oscillations takes place only in the direction of the symmetric axis between the end caps (so-called z axis) of the quadrupole field. Therefore, the ions leave the quadrupole field in the direction of the end caps without absorbing energy at right angles to this direction (in the direction of the ring equator, the so-called r direction). Consequently, the ions have a particularly high probability of leaving the ion trap through the small holes in the center of the end cap.

Since the secular frequency (f) is associated with the storage frequency (F) by the equation $f=\beta_z{}^*F/2$, the following secular frequencies are associated with the three storage field resonances stated above:

quadrupole stability limit: $f_4=F/2$ for $\beta_z=2/2$ nonlinear hexapole resonance: $f_6=F/3$ for $\beta_z=\frac{2}{3}$ nonlinear octopole resonance: $f_8=F/4$ for $\beta_z=2/4$ Coherent pushing of tile secular oscillation for an ion type optimally should take place very shortly (approximately 10 to 100 microseconds) before the storage field resonance is reached so that the coherently oscillating ions of the ion cloud are not again disturbed by collisions with the remaining gas. Irrespective of the scanning parameters (both frequency and amplitude scanning of the storage RF are possible), a secular ion oscillation frequency slightly lower than F/2, F/3 or F/4 is present just before resonance is reached. The excitation frequency, which must be applied to the two end cap electrodes in order to push the oscillation, has to be in resonance with this somewhat lower frequency. It therefore also has to be slightly lower than F/2, F/3 or F/4.

Experimentally, this method functions very well according to expectations, provided the scanning process itself is relatively slow. Here, a "slow" scanning process is to be understood as one in which the ions of a mass are ejected in a time longer than approximately 30 to 50 cycles of the secular frequency. The method is, however, of particular interest for extremely fast scanning processes in which only approximately 8 to 16 cycles of the secular frequency are used per mass. Experimentally, the ions of a mass can be almost completely ejected in approximately 5 to 7 oscillations. Surprisingly, very fast scanning processes unexpectedly produce measuring results which fluctuate considerably. The mass spectra are not quantitatively reproducible. The quantitative fluctuations of the results are many times higher than those of statistical forecasts based on ion counts.

A more careful examination of the ejection processes by means of computer simulations provides the reason for the considerable signal fluctuations with fast scans. To avoid fluctuations, it is not only necessary to excite the secular frequency of the ions before they reach nonlinear resonance, but the excited secular oscillation must also have a favorable phase position for the nonlinear resonance which is the same for all masses at the maximum of the ejection cycle. With a slow scanning process, the phase positions are averaged. This is not the case with fast scanning processes. The phase position continuously changes during the scanning process, i.e. the phase "runs through".

SUMMARY OF THE INVENTION

The improvement of fast scanning methods according to the invention comprises setting the frequency ratio and the phase relationships between the storage frequency and the excitation frequency and controlling the scan profiles in such a way that the ions of consecutive masses each gain precisely the same "phase rhythm" or "phase sequence" with the phase rhythm being optimally set in accordance with the nonlinear resonance conditions used for ion ejection. Here, "phase rhythm" refers to the historical succession of phase positions up to ejection.

According to one embodiment of the invention, the excitation voltage frequency is set to a value somewhat smaller that an integral fraction of the storage voltage frequency according to the mathematical expression, $r=n/(n^*m+1)$, where r is the ratio of the excitation voltage frequency to the storage voltage frequency, m is all integer related to the field type (quadrupole, octopole, etc. ) used for the field resonance condition and n is an integer.

The scan profile is set in such a way so that the same amount of time is required for each mass to be ejected, precisely an integer number of cycles of the excitation frequency occur per mass, and the integer number is a multiple (or simple) of the number n.

DETAILED DESCRIPTION OF THE PREFERRED EMBODIMENT

Figure 1:
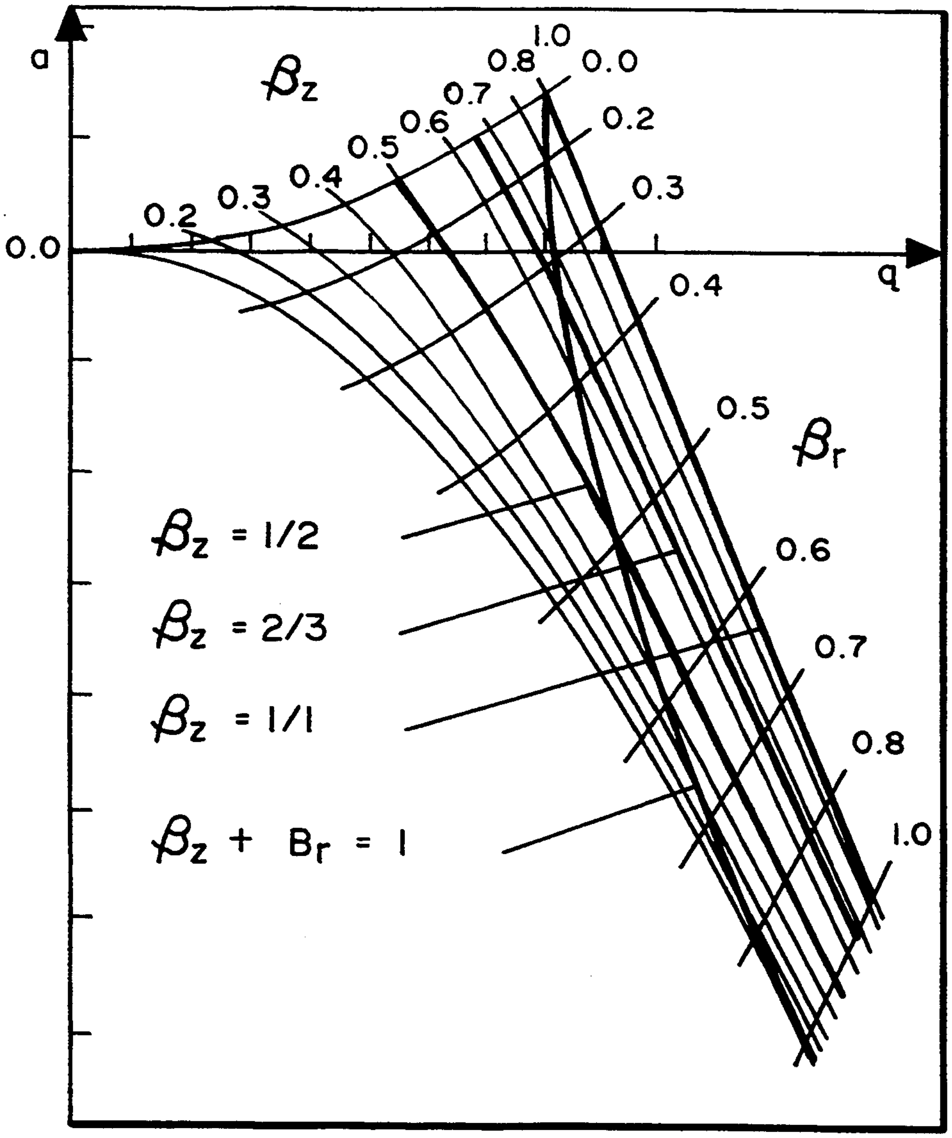
FIG. 1 is all a,q stability diagram with isobeta lines describing the secular frequencies in the r and z directions.

In accordance with the invention it is necessary to correctly align the excitation frequency to the storage frequency so that optimal ion ejection occurs. An excitation frequency, which is a simple fraction (1/m) of the storage frequency, can easily be coupled to the storage frequency in a locked phase relation. If this is done, "m" cycles of the storage frequency then precisely correspond to one cycle of the excitation frequency.

For the aforementioned reasons, however, the excitation frequency, which is to become effective before reaching the field resonance condition, cannot be a simple fraction of the storage frequency for first scan operations. According to the above, the ratio (r) of the excitation frequency and storage frequency must always be a little smaller than a simple fraction (1/m) (with m=2, 3 or 4 for quadrupole, hexapole or octopole, respectively).

To be able to achieve an identical phase sequence for each mass at all, the ratio (r) of the excitation frequency and storage frequency must first be a fraction consisting of whole numbers. The above condition of an integral fraction somewhat smaller than 1/m can be achieved by the mathematical expression, $r=n/(n*m+1)$, whereby approximately $2<=n<20$ ought to hold for n (where * represents a multiplication function).

The following numerical examples illustrate values of the ratio, r, when hexapole superposed fields are used for resonance. With a storage frequency of F=1MHz and a superposed hexapole field (m=3) the field resonance of which occurs at 333.3 kHz, the following potential excitation frequencies (f) occur with the relationship, excitation frequency =r* storage frequency, where $r=n/(n*m+1)$:

| n | Ratio (r) | Excitation frequency (f) |
|---|---|---|
| 2 | 2/7 | 285.7 kHz |
| 3 | 3/10 | 300.0 kHz |
| 4 | 4/13 | 307.7 kHz |
| 5 | 5/16 | 312.5 kHz |
| 6 | 6/19 | 315.8 kHz |
| 7 | 7/22 | 318.2 kHz |
| 8 | 8/25 | 320.0 kHz |
| 9 | 9/28 | 321.4 kHz |
| 10 | 10/31 | 322.6 kHz |
| 12 | 12/37 | 324.3 kHz |
| 14 | 14/43 | 325.6 kHz |
| 16 | 16/49 | 326.5 kHz |
| . | . | . |
| . | . | . |
| . | . | . |

All of these frequencies can be generated with modern technical means and coupled to the storage frequency in a locked phase relation with the phase relationships required. The task according to the invention is to ensure that all ion masses successively pass through the same history of phase relationships. This latter condition can be met if the scan profile is set in such a way that the same time (t) is required for each mass to be ejected and that precisely an integer number of cycles of the excitation frequency is used per mass, and the integer number of cycles is chosen as a multiple of (or simply equal to ) the integer number n.

For example, if the scan profile is set so that precisely 10 cycles of the excitation or secular frequency are required ejection of each mass, the above condition can be met either with n=5 or with n=10. The excitation frequencies are then either 312.5 or 322.6 kHz. The scan times (t) for a trait of mass then correspond to either t=10*16/5=32, or t=10*31/10=31, microseconds. In the first case, precisely 2*5 cycles of the secular frequency and precisely 32 cycles of the storage frequency occur, mass by mass, in the time (t) in which a mass on the mass scale is passed through. In the second case, precisely 10 cycles of the secular frequency and precisely 31 cycles of the storage frequency occur per mass. The phase relationships do not therefore shift from mass to mass. Each mass experiences exactly the same rhythm of phase relationships. Any expert can easily establish similar relationships for quadrupole and octopole with appropriate consideration.

In order to achieve the most favorable conditions for ion ejection, it is also necessary to make the phase relationship between the storage frequency and the excitation frequency adjustable at a set time, for example, at the start of the scan, in such a way that the phase displacement can be experimentally set for an optimally short ejection cycle per mass.

A further improvement of the method is obtained if the individual ion packages ejected at the rate of the secular frequency are also measured at this rate by a phase-sensitive amplifier. The use of such an amplifier is described in detail in a copending application entitled "Method and Device for In-phase Measuring of Ions from Ion Trap Mass Spectrometers" filed at the same time as the present application by Joehen Franzen, Gerhard Heinen, Gerhard Weiss and Reemt-Holger Gabling and assigned to the same assignee, the disclosure of which is hereby incorporated by reference. The phase-sensitive amplifier can also be an in-phase controlled sample-and-hold amplifier with digitizer.

The precise secular frequency on ejection of the ion packages is, however, unknown. Since it is almost identical to the secular frequency of the resonance condition, it is therefore approximately F/2, F/3 or F/4 for quadrupole, hexapole or octopole fields. There is, however, no event which could be used as a trigger signal for the precisely correct frequency and phase position of the ion packages. A good approximation is, however, the clock pulse of the excitation RF provided with an adjustable phase displacement. In accordance with a typical fast scanning operation, fifty percent of the ions of a mass are typically ejected in approximately 3 secular frequency cycles, approximately 90% in 5 cycles and approximately 100% in 7 cycles. With so few cycles, the slight phase displacement between the secular frequency at the time of excitation and that at the time of resonance is of minor importance. A preferred embodiment according to the invention therefore includes in-phase measurement of the ion pulses ejected at the rate of the excitation RF.

Figure 2:
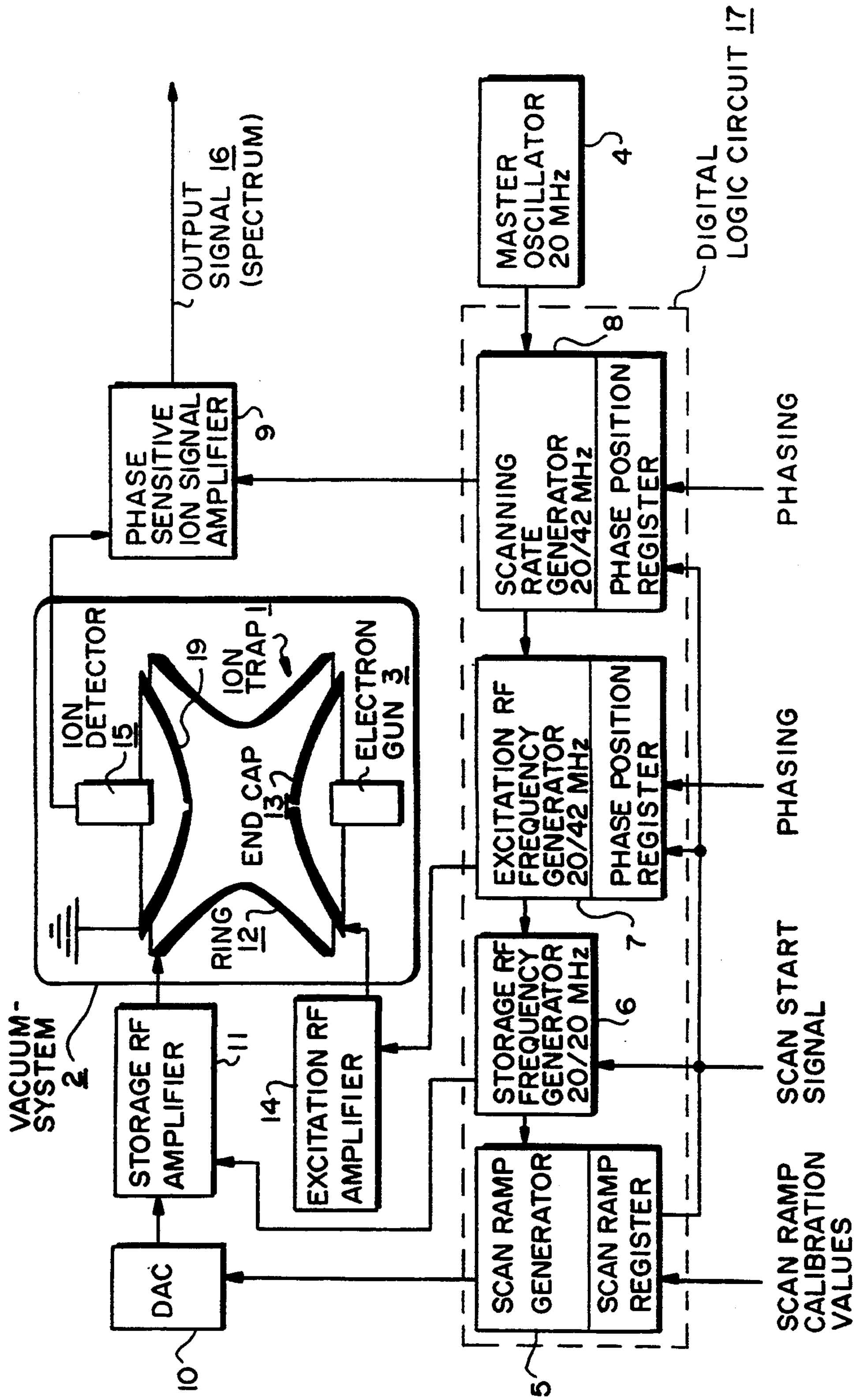
FIG. 2 is a preferred block diagram of circuitry for supplying the ion trap with the necessary RF voltages and for measurement of the ion pulse streams for production of a mass spectrum. Digital control of the phase relationships and phase positions of the excitation RF and scanning rate with regard to the storage RF and start of the scan is shown in particular.

A preferred device for carrying out the method is shown in FIG. 2 as a block diagram. A weak hexapole field may be superposed on the quadrupole field of the ion trap (1) by the shape (not shown in detail in FIG. 1) of the electrodes (as described in DE-OS P 40 17 264-3), but the discussion below will assume that the non-linear region of the quadrupole field at the edge of the a,q diagram is used for ion ejection. The ion trap is in a vacuum system (2) and can be filled through an inlet (not shown) with traces of substances, the mass spectra of which are to be recorded, and with a collision gas for damping the ion oscillations.

An electron gun (3) produces an electron beam which can be controlled by pulses. The beam generates ions of the substances during an ionization cycle, which ions are thermalized in a subsequent damping interval by colliding with the collision gas.

The basic pulse rate of the scan ramp generator (5) as well as the frequencies for the storage RF frequency generator (6) (1 MHz), the excitation RF frequency generator (7) (10/21 MHz) and the scanning rate generator (8) for the phase-sensitive amplifier (9) (also 10/21 MHz) are derived from a master oscillator (4) with a base frequency of 20MHz.

In accordance with one embodiment of the invention, the frequencies of the excitation frequency RF generator (7) and the scanning rate generator (8) are set using $m=2$ (due to the quadrupole field in the ion trap (1) and $n=10$. The phase position of the RF frequency generator and the scanning rate generator can be set digitally relative to the time at which the scan start signal is given by means of phasing signals introduced into the corresponding digital registers.

The scan ramp generator (5) can be digitally provided with calibration values for a mass scan profile in order to control the scan ramp in such a way that precisely 21 microseconds always pass from mass to mass, thus satisfying all of the conditions of the method according to the invention.

The scan ramp generator (5) controls the amplitude of the storage RF amplifier (11), via a digital/analog converter (ADC) (10). The frequency of storage RF amplifier (11 ) is obtained from the storage RF frequency generator (6). In the example, the storage RF is only connected to the ring electrode (12). The ion trap has a grounded end cap electrode (19), and a second end cap electrode (13), to which the weak excitation RF is fed. Experimental findings show that no harm is caused whatsoever by the slight asymmetry of the electrode voltages. The excitation RF originates from the excitation RF amplifier (14) which obtains its frequency from the excitation RF frequency generator (7). The amplitude of the excitation voltage may also be optimally set in relation to the amplitude of the storage RF frequency in accordance with the method described in a copending application entitled "Method and Device for control of the Excitation Voltage For Ion Ejection From Ion Trap Mass Spectrometers", filed on the same date as this application by Jochen Franzen and Reemt-Holger Gabling and assigned to the same assignee as the present invention, which application is hereby incorporated by reference.

The ions ejected are measured via an ion detector (15), preferably a secondary-emission multiplier. The analog signal from the secondary-emission multiplier, amplified with practically no time delay, is supplied to the phase-sensitive ion signal amplifier (9) and also digitized there. The consecutive digital values of the output signal (16) form the raw spectrum which can be processed further with known means in a data system.

The digital logic circuit (17) can preferably consist of a microprocessor for scan control and an LCA module for generating the frequencies and their phase positions.

What is claimed is:

1. A method for generating a mass spectrum of ions utilizing apparatus including a storage ion trap, a mechanism for introducing ions into the ion trap and a detector for detecting ions ejected from the trap and generating an output signal, the ions being ejected from the trap in groups of ion pulses, each of the ions in an ion pulse group having substantially equal mass and being ejected during an ejection cycle corresponding to that group, each ejection cycle being of a finite time duration, the method comprising:

applying to the storage ion trap with a storage signal generator an oscillating storage signal having an amplitude, a frequency and a phase;

applying to the storage ion trap with an excitation signal generator, an oscillating excitation signal having a frequency and a phase relative to the frequency and phase of the storage signal;

setting the frequency and phase of the excitation signal relative to the frequency and phase of the storage signal such that the phase of the excitation signal coincides with the phase of the storage signal periodically and the time period between said phase coincidences is t; and varying the amplitude of the storage signal to consecutively eject ion pulse groups from the trap such that the time between the start of successive ejection cycles is constant and equal to t.

2. A method according to claim 1 wherein setting the frequency and phase of the excitation signal relative to the frequency and phase of the storage signal comprises setting a frequency for the excitation signal which is slightly lower than a simple fraction of the storage frequency.

3. A method according to claim 2 wherein, for an ion trap using a quadrupole field with a superposed hexapole field, setting the frequency and phase of the excitation signal relative to the frequency and phase of the storage signal comprises setting the excitation frequency ($f_e$) relative to the storage frequency ($f_s$) according to the equation $f_e=(r)(f_s)$ where $r=n/(3n+1)$ and n is an integer.

4. A method according to claim 2 wherein, for an ion trap using a quadrupole field with a superposed octopole field, setting the frequency and phase of the excitation signal relative to the frequency and phase of the storage signal comprises setting the excitation frequency ($f_e$) relative to the storage frequency ($f_s$) according to the equation $f_e=(r)(f_s)$ where $r=n/(4n+1)$ and n is an integer.

5. A method according to claim 1 wherein, for an ion trap using a quadrupole storage field, setting the frequency and phase of the excitation signal relative to the frequency and phase of the storage signal comprises setting the excitation frequency ($f_e$) relative to the storage frequency ($f_s$) according to the equation $f_e=(r)(f_s)$ where $r=n/(2n+1)$ and n is an integer.

6. A method according to one of claims 5, 3 or 4 wherein n is greater than one and less than twenty-one.

7. A method according to claim 1 wherein varying the amplitude of the storage signal further comprises varying the amplitude of the storage signal relative to the phases of the excitation signal and the storage signal such that the phase coincidences occur at the midpoint in time of each ejection cycle.

8. A method according to claim 1 wherein varying the amplitude of the storage signal further comprises varying the amplitude of the storage signal relative to the phases of the excitation signal and the storage signal such that the phase coincidences occur at a time during each ejection cycle at which a maximum ion output is expected.

9. A method according to claim 1 further comprising sampling the output signal of the detector with a phase sensitive amplifier.

10. A method for generating a mass spectrum of ions utilizing apparatus including a storage ion trap, a mechanism for introducing ions into the ion trap and a detector for detecting ions ejected from the trap, the ions being ejected from the trap in groups of ion pulses, all of the ion pulses in an ion pulse group comprising ions of substantially equal masses and being ejected during an ejection cycle corresponding to that group, each ejection cycle being of a finite time duration, the method comprising:

applying to the storage ion trap with a storage signal generator an oscillating storage signal having an amplitude, a frequency and a phase;

applying to the storage ion trap with an excitation signal generator an oscillating excitation signal having a frequency and a phase relative to the frequency and phase of the storage signal;

setting the frequency and phase of the excitation signal relative to the frequency and phase of the storage signal to make the frequency of the excitation signal slightly smaller than a simple fraction of the frequency of the storage signal so that the phase of the excitation signal coincides with the phase of the storage signal periodically and the time period between successive phase coincidences is t; and varying the amplitude of the storage signal to consecutively eject ion pulse groups from the trap such that the time between the start of successive ejection cycles is constant and equal to t and the phase coincidences occur at a time during each ejection cycle at which a maximum ion output is expected.

11. A method according to claim 10 wherein the ion trap uses a quadrupole storage field and setting the excitation signal frequency and phase relative to the storage signal frequency and phase comprises setting the excitation frequency ($f_e$) relative to the storage signal frequency ($f_s$) according to the equation $f_e=(r)(f_s)$ where $r=n/(2n+1)$ and n is an integer.

12. A method according to claim 10 wherein the ion trap uses a quadrupole storage field superposed by a hexapole field and setting the excitation signal frequency and phase relative to the storage signal frequency and phase comprises setting the excitation signal frequency ($f_e$) relative to the storage signal frequency ($f_s$) according to the equation $f_e=(r)(f_s)$ where $r=n/(3n+1)$ and n is an integer.

13. A method according to claim 10 wherein the ion trap uses a quadrupole field superposed by an octopole field and setting the excitation signal frequency and phase relative to the storage signal frequency and phase comprises setting the excitation signal frequency ($f_e$) relative to the storage signal frequency ($f_s$) according to the equation $f_e=(r)(f_s)$ where $r=n/(4n+1)$ and n is an integer.

14. A method according to claims 11, 12 or 13 wherein n is greater than one and less than twenty-one.

15. Apparatus for recording a mass spectrum, the apparatus comprising:

a quadrupole storage ion trap;

a storage signal generator for applying to the storage ion trap an oscillating storage signal having an amplitude, a frequency and a phase;

an excitation signal generator for applying to the storage ion trap an oscillating excitation signal having a frequency and a phase relative to the frequency and phase of the storage signal;

an ion detection circuit for detecting ions ejected from the trap and generating an output signal, the ions being ejected from the trap in groups of ion pulses, all of the ion pulses in an ion pulse group comprising ions of substantially equal masses and being ejected during an ejection cycle corresponding to that group, each ejection cycle being of a finite time duration;

a frequency control circuit which sets the frequency of the excitation signal relative to the frequency of the storage signal such that the phase of the excitation signal coincides with the phase of the storage signal periodically and the time period between said phase coincidences is t; and a scanning control circuit which varies the amplitude of the storage signal to consecutively eject ion pulse groups from the trap such that the time between the start of successive ejection cycles is constant and equal to t.

16. Apparatus according to claim 15 wherein the frequency control circuit sets the frequency of the excitation signal frequency such that it is slightly lower than a simple fraction of the storage frequency.

17. Apparatus according to claim 16 wherein the ion trap uses a quadrupole storage field and the excitation frequency ($f_e$) is related to the storage frequency ($f_s$) by the equation $f_e=(r)(f_s)$ where $r=n/(2n+1)$ and n is an integer.

18. Apparatus according to claim 16 wherein the ion trap uses a quadrupole field with a superposed hexapole field and the excitation frequency ($f_e$) is related to the storage frequency ($f_s$) by the equation $f_e=(r)(f_s)$ where $r=n/(3n+1)$ and n is an integer.

19. Apparatus according to claim 16 wherein the ion trap uses a quadrupole field with a superposed octopole field and the excitation frequency ($f_e$) is related to the storage frequency ($f_s$) by the equation $f_e=(r)(f_s)$ where $r=n/(4n+1)$ and n is an integer.

20. Apparatus according to claim 15 wherein the scanning control circuit varies the amplitude of the storage frequency storage signal so that the midpoint of each ejection cycle occurs substantially at a time of one of said phase coincidences between the storage signal and the excitation signal.

21. Apparatus according to claim 20 wherein the scanning control circuit varies the amplitude of the storage signal such that for each ejection cycle a time at which a maximum ion output is expected coincides with one of said phase coincidences between the storage signal and the excitation signal.

22. Apparatus according to claim 15 further comprising a phase-sensitive amplifier which samples the output signal of the ion detector.

23. Apparatus for recording a mass spectrum, the apparatus comprising:

a quadrupole ion trap;

a storage signal generator for applying to the ion trap an oscillating storage signal having an amplitude, a frequency and a phase;

an excitation signal generator for applying to the ion trap an oscillating excitation signal having a frequency and a phase relative to the frequency and phase of the storage signal;

an ion detection circuit for detecting ions ejected from the trap and for generating an output signal, the ions being ejected from the trap in groups of ion pulses, all of the ion pulses in an ion pulse group comprising ions of substantially equal masses and being ejected during an ejection cycle corresponding to that group, each ejection cycle being of a finite time duration;

a frequency control circuit for controlling the frequency and phase of the excitation signal relative to the frequency and phase of the storage signal such that the frequency of the excitation signal is slightly lower than a simple fraction of the storage frequency so that the phase of the excitation frequency coincides with the phase of the storage frequency periodically and the time period between successive phase coincidences is t; and a scanning control circuit for varying the amplitude of the storage signal to consecutively eject ion pulse groups from the trap such that the time between the start of successive ejection cycles is constant and equal to t and said phase coincidences occur at a time during each ejection cycle at which a maximum ion output is expected.

24. Apparatus according to claim 23 wherein the frequency control circuit comprises a microprocessor.

25. Apparatus according to claim 23 wherein the frequency control circuit comprises a programmable logic array.

26. Apparatus according to claim 23 wherein the frequency control circuit comprises a logic cell array.

* * * * *